Figure 1:
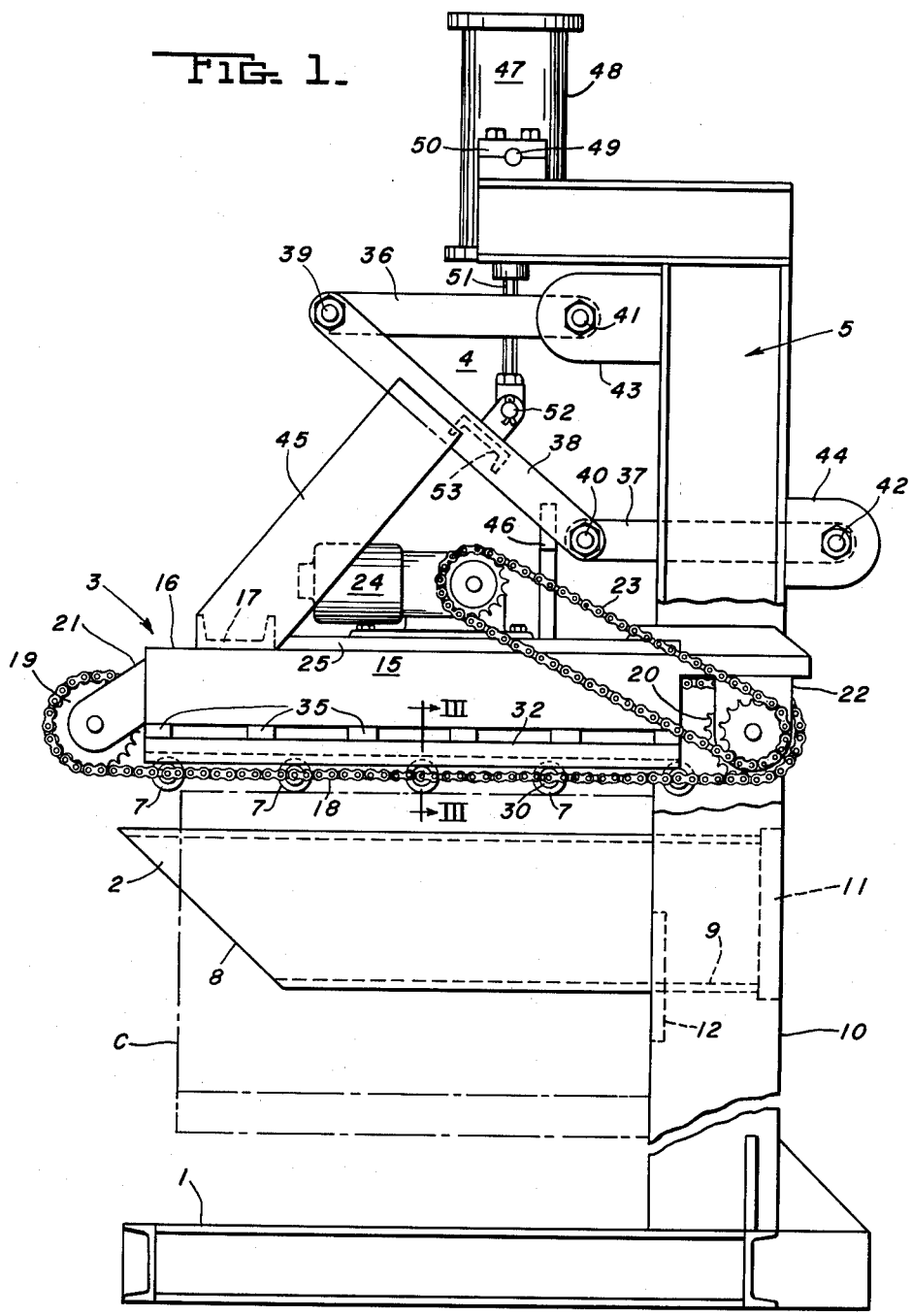

Sept. 7, 1965

J. R. LANE 3,204,501

APPARATUS FOR CUTTING COILED METAL STRIP INTO SHEETS

Filed Jan. 22, 1962

2 Sheets-Sheet 1

INVENTOR.
JOHN R. LANE
By Donald G. Dalton
Attorney

Sept. 7, 1965 J. R. LANE 3,204,501
APPARATUS FOR CUTTING COILED METAL STRIP INTO SHEETS
Filed Jan. 22, 1962 2 Sheets-Sheet 2
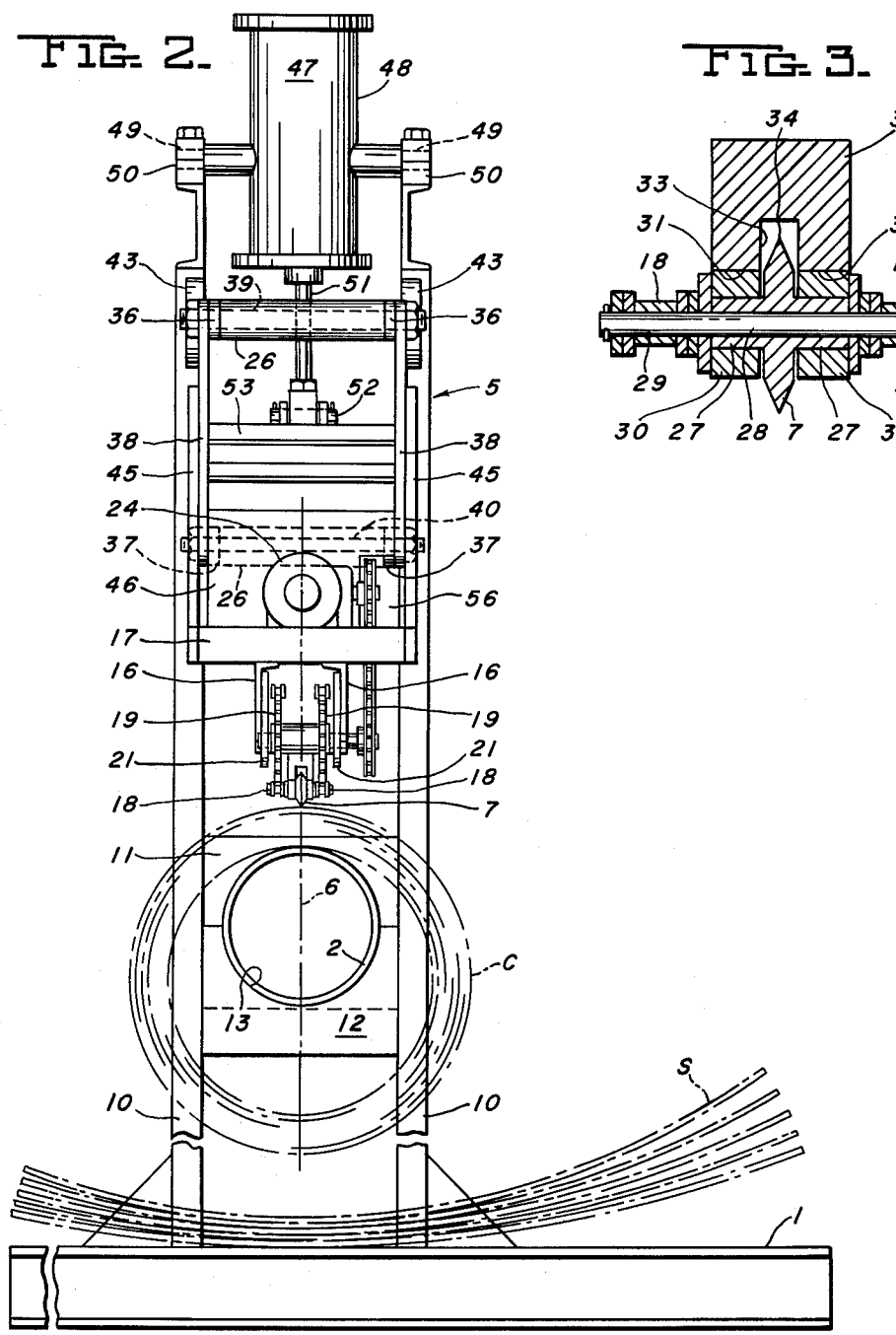
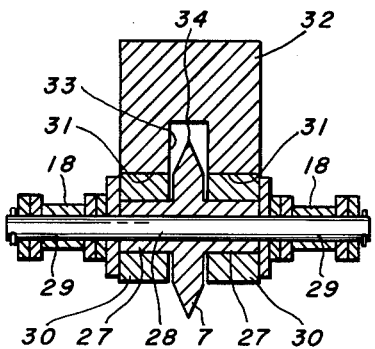
INVENTOR.
JOHN R. LANE
By Donald G. Dalton
Attorney

United States Patent Office 3,204,501
Patented Sept. 7, 1965

3,204,501
APPARATUS FOR CUTTING COILED METAL STRIP INTO SHEETS
John R. Lane, Pittsburg, Calif., assignor to United States Steel Corporation, a corporation of New Jersey
Filed Jan. 22, 1962, Ser. No. 167,785
10 Claims. (Cl. 83—10)

This invention relates to the practice of scrapping defective coils of metal strip and, as indicated, more particularly to apparatus for cutting defective coils of metal strip into sheets and thus to a form that facilitates its being used as scrap in smelting operations.

Defective coils of metal strip, for example, coils of can stock such as black-plate or tin-plate and coils of heavier gauge strip, are usually too large to permit their being charged as scrap in an open hearth or other steel furnace. To enable their use as scrap, the coils must be cut into sheets for subsequent processing in baling or other apparatus to a form suitable for charging as scrap in a furnace. For this purpose the coils are usually cut by torches, but the heat generated by cutting in this manner frequently welds or fuses adjacent coil convolutions and thus prevents their subsequent separation. This is particularly troublesome in scrapping coils of tin plate where recovery of the tin is desired.

One of the principal objects of this invention is to provide an apparatus for cutting coils of metal strip which does not require any uncoiling operation and eliminates the disadvantages of present torch-cutting practices.

A further object is to provide an apparatus according to which the convolutions of a coil are separated into sheets by cutting them sucessively along a line extending axially of the coil outer surface while holding the coil along a line positioned radially inwardly from the line of cutting and extending axially of its innermost convolution. For this and related purposes, the apparatus according to a preferred embodiment of the invention comprises a mandrel on which a coil to be scrapped is supported in a horizontal position, and cutter elements that are moved by an endless conveyor over a path positioned vertically above the axis of the coil on the mandrel while they are held in cutting engagement with the outermost coil convolutions, the mandrel acting as an anvil against which the coil convolutions are compressed by the cutting action of the cutter elements.

Other objects and advantages of the invention will become apparent from the following description and the accompanying drawings, which illustrate a preferred embodiment of the invention. In the drawings:

FIGURES 1 and 2 are elevational views of an apparatus constructed in accordance with the principles of this invention in FIGURE 2 of which a portion of the endless conveyor for the coil cutter knives has been broken away and is shown fragmentarily; and FIGURE 3 is an enlarged sectional view taken substantially along the line III—III of FIGURE 1.

Generally stated, the apparatus of this invention comprises a base in the form of a platform 1, a mandrel 2 mounted in a horizontal position spaced above and extending over the platform 1, a strip cutting mechanism 3 above the mandrel 2, and a linkage 4 in the form of a parallelogram supporting the cutting mechanism 3 for vertical movement on a supporting frame 5. In operation, a coil C of metal strip, either black-plate or tin-plate, for example, is manipulated by a fork-lift truck to a position supported on the mandrel 2 as shown in the drawings. In this position, the axes of the coil C and mandrel 2 lie in a common vertical plane, designated by the broken center-line 6 in FIGURE 2, and the coil C has supporting engagement with the mandrel 2 along a line in this plane that extends axially over the innermost coil convolution and centrally over the upper surface of the mandrel 2. After the coil C is supported on the mandrel, the supporting linkage 4 is operated to lower the cutting mechanism 3 to a position in which cutting elements 7 forming a part thereof operate in a manner to be described to successively cut the outer convolutions of the coil C along an axially extending line lying in the plane 6 that is located radially outwardly from the line along which the mandrel 2 has supporting engagement with the coil C. As the convolutions are severed, the cut sheets fall away from the coil C in much the same manner as flipping pages in a book. They gravitate downwardly and are collected on a pallet or the platform 1 in a stack S as indicated diagrammatically by the broken lines in FIGURE 2. After the severed coil convolutions are collected in a stack S, they are removed for subsequent processing in baling or other apparatus to a form suitable for charging as scrap into an open hearth or other smelting furnace.

The mandrel 2, as shown in FIGURES 1 and 2, is a steel cylinder that has its forward end 8 cut on a downward angle to facilitate the use of fork-lift trucks in hanging the coils C thereon. Its inner end 9 is rigidly supported on a pair of laterally spaced vertical channels 10 that form part of the supporting frame 5. It is supported on the channels 10 by a plate 11 that has welded connections with the channels 10 and the terminal portion of the mandrel end 9, and by a saddle plate 12 that is spaced forwardly with respect to the plate 11 and is also welded on the channels 10. The saddle plate 12 has a semicircular recess 13 in which the mandrel 2 is received. The mandrel 2 is mounted on the frame 5 at an elevation above the platform 1 sufficient to provide space for the collection thereon of a stack S of sheets that are formed by cutting the convolutions of a coil C.

The coil cutting mechanism 3 comprises a horizontal frame 15 that is mounted for vertical movement relative to the supporting frame 5 and comprises a pair of laterally spaced channels 16 that are suspended from a transversely extending upper channel 17. The cutter elements 7 are circular or disc-shaped knives carried by an endless conveyor that is mounted on the frame 15 and comprises a pair of laterally spaced endless conveyor chains 18 respectively trained over sprocket wheels 19 and 20 rotatably supported on brackets 21 and 22 at opposite ends of the frame 15. The sprocket wheel 20 is driven by a chain drive 23 that is operated by an electric motor 24 mounted on a horizonal plate 25 that is supported on and secured to the upper edges of the channels 16 and forms part of the supporting frame 15.

The cutter elements 7 are mounted at uniformly spaced intervals along the length of the conveyor chains 18. As best shown in FIGURE 3, the hub of each cutter element 7 has oppositely projecting end portions 27 that are rotatably supported on a transversely extending pin 28. Opposite ends 29 of the pin 28 act as connecting pivots for the ends of adjacent links in the chains 18. Movement of the cutters 7 over the lower horizontal run of the chains 18 is guided by rollers 30 mounted on the hub end portions 27, which have rolling engagement with opposite edge portions 31 of the lower surface of a guide bar 32. The guide bar 32 has a central recess 33 through which the cutting edges 34 of the knives 7 travel during movement of the rollers 30 over the surface edge portions 31. The guide bar 32 is secured to the lower edges of the channels 16 by a plurality of bars 35 that have welded connections with the channels 16 and with the upper edge of the guide bar 32. In a manner to be described, the guide bar 32 further operates to force the cutter elements 7 downwardly to maintain them in cutting engagement with the outer convolution of the coil C during their movement over the lower runs of the chains 18.

As indicated, the mounting linkage 4 provides for vertical movement of the cutter mechanism 3 with respect to the supporting frame 5. The linkage 4 is a parallelogram that is formed by parallel upper and lower pivot links 36 and 37, and a movable link 38 that has pivotal connections 39 and 40 at its upper and lower ends respectively with the outer ends of the pivot links 36 and 37. The inner ends of the links 36 and 37 have stationary pivotal connections 41 and 42 on brackets 43 and 44 that are secured to the vertical channels 10 of the supporting frame 5. The portion of the frame 5 between the stationary pivots 41 and 42 forms the fixed link of the parallelogram 4. As best shown in FIGURE 2, the links 36, 37 and 38 are arranged in laterally spaced pairs and are held in spaced relation by cylindrical spacer tubes 26 mounted concentrically on the pivot pins 39 and 40.

The frame 15 is suspended in a horizontal position from the movable links 38 by a pair of laterally spaced plates 45 that have welded connections at their lower ends to opposite ends of the transverse channel 17 and at their upper ends to the links 38, and by a transversely extending vertical plate 46 that has welded connections with both the frame plate 25 and the movable links 38. At one side the plate 46 is recessed to provide an opening 56 for the chain drive 23. By reason of this arrangement, pivotal movement of the links 36 and 37 does not change the angular inclination or the horizontal position of the link 38 relative to the frame 15, and pivotal movement of the links 36 and 37 is thus operative to impart vertical movement to the frame 15.

Vertical movement of the frame 15 is controlled by a fluid pressure motor 47. The motor 47 includes a cylinder 48 having oppositely projecting trunnions 49 that are rotatable in bearings 50 and support it for rocking movement on the frame 5. A piston rod 51 projecting from the lower end of the cylinder 48 has a pivotal connection 52 to a cross bar 53 extending transversely between the movable links 38. As the piston rod 51 is moved to and from an extended position relative to the cylinder 48, the movable links 38 are operated to raise and lower the cutter mechanism 3 relative to the coil supporting mandrel 2.

In operation, the linkage 4 is first actuated by the motor 47 to raise the mechanism 3 to an elevated position after which a coil C is placed on the mandrel 2 in a horizontal position as shown in FIGURES 1 and 2 of the drawings. The motor 47 is then operated to move the link 38 and frame 15 suspended therefrom downwardly to a position in which the cutter elements 7 have cutting engagement with the outer convolutions of the coil C on the mandrel 2. The force of cutting engagement of the elements 7 with the coil C is determined by the gravitational bias due to the weight of the over-lying parts and by the pressure of the fluid supplied to the motor 47. Operation of the conveyor chains 18 by the motor 24 moves the cutting edges 34 of the cutters 7 over the outermost convolution of the coil C along an axial path lying in the vertical plane 6. Attention is particularly directed to the fact that the engagement of the guide bar edge portions 31 with the rollers 30 operates to hold the cutters 7 in cutting engagement with the coil C. In addition, and since the path of movement of the knife edges 34 on the cutters 7 over the coil is directly above the axial line in the plane 6 at which the coil has supporting engagement with the mandrel 2, it will be apparent that the mandrel 2 further serves as an anvil while the coil convolutions are being cut by the elements C. After being cut the convolutions open and gravitate downwardly for collection in a stack S as described above.

When cutting coils of strip that has a high mirror finish, such as tin-plate or strip coated with other materials, the cut sheets have a tendency to slide on each other and this makes handling or collection in a stack S difficult. To prevent sliding of this character, a holding strap (not shown) is wrapped about the coil C in an axial or endwise direction along a line lying directly underneath the mandrel axis, to restrain the sheets against sliding on each other after the coil convolutions are severed. Some coils, especially those not plated, do not require strapping in this manner. When cutting a coil or uncoated strip, a pallet is held firmly in place by a fork-lift truck against the underside of the coil and supports the sheets as they are cut.

While one embodiment of my invention has been shown and described it will be apparent that other adaptations and modifications may be made without departing from the scope of the following claims.

I claim:

1. An apparatus for separating the convolutions of a coil of metal strip into sheets comprising a mandrel for holding engagement with said coil along an inner line extending axially of its innermost convolution, said inner line and the axis of said coil lying in a common vertical plane, and means for successively cutting the outer convolutions of said coil comprising an endless conveyor having a plurality of cutter elements at spaced intervals along its length and one run thereof parallel to the axis of and spaced radially outwardly from the coil held by said mandrel, means mounting said conveyor for movement to a position in which its said cutter elements during movement over its said one run have cutting engagement with the outermost convolution of said coil along an axial path in said vertical plane and parallel to and radially outwardly of said inner line, and means for operating said conveyor continuously to move said cutter elements and cut the convolutions of said coil into sheets.

2. An apparatus for cutting the convolutions of a coil of metal strip into sheets comprising a mandrel extending axially of and supporting said coil in a horizontal position, an endless conveyor mounted above said mandrel and having a lower run parallel to the axis of said coil, said lower run lying in a vertical plane containing the said axis of said coil, a plurality of cutter elements mounted at spaced intervals along said conveyor, means for operating said conveyor continuously to move said cutter elements successively over said lower run, means mounting said conveyor for vertical movement to an operative cutting position in which its said cutter elements during movement over said lower run have cutting engagement with the outermost convolution of said coil along an axial path in said vertical plane and vertically above said mandrel, and means for operating said conveyor to render said cutter elements effective to cut said coil into sheets.

3. An apparatus as defined in claim 2 characterized by said endless conveyor comprising a chain and by said cutter elements comprising circular knives respectively mounted for rotation about axes extending transversely with respect to said chain and for cutting movement with a rolling action over said outermost coil convolutions.

4. An apparatus as defined in claim 3 characterized by means for holding said cutter elements against vertical movement out of cutting engagement with said outermost coil convolution during movement over said conveyor lower run, said holding means comprising guide rollers mounted on said chains on opposite sides of each of said circular knives for rotation about the respective axes of said knives, and a stationary guide bar over which said rollers travel during movement over said conveyor lower run.

5. An apparatus as defined in claim 2 characterized by said conveyor mounting means being a parallelogram linkage comprising a stationary support with spaced upper and lower pivots thereon defining a fixed link, a movable link parallel to said fixed link, upper and lower links having connections at one end respectively with said spaced pivots and pivotal connections at their other ends with opposite ends of said movable link, and a bracket support for said conveyor on said movable link rendering its movement in response to pivotal movement of said upper and lower links about said spaced upper and lower pivots effective to impart vertical movement to said conveyor.

6. An apparatus as defined in claim 5 characterized by means including a fluid pressure motor for operating said linkage to impart said vertical movement to said conveyor.

7. An apparatus as defined in claim 6 characterized by said motor comprising a cylinder having trunnions mounting it for rocking movement on said stationary support, and a piston having a pivotal connection at its outer end with said movable link.

8. An apparatus for cutting a coil of metal strip into sheets comprising a platform, a vertical support at one side of said platform, a mandrel spaced vertically above said platform for supporting said coil in a position over said platform with its axis extending horizontally, said mandrel having a supporting connection at its inner end with said vertical support and projecting horizontally outwardly therefrom for supporting engagement with the innermost convolution of said coil, and coil cutting means comprising an endless conveyor having a plurality of cutter elements at spaced intervals along its length and a lower run thereof parallel to the axis of and spaced radially outwardly from said coil, said lower run lying in a vertical plane containing the said axis of said coil, means mounting said conveyor for vertical movement to a position in which said cutter elements during movement over its said lower run have cutting engagement with the outermost convolution of said coil along an axial path in said vertical plane and above said mandrel, and means for operating said conveyor continuously to move said cutter elements and cut the outermost convolutions of said coil successively into sheets for gravitational movement downwardly with respect to said coil to superimposed positions supported on said platform.

9. An apparatus as defined in claim 8 characterized by each of said cutter elements comprising a circular knife supported on said endless conveyor for rotation about an axis extending transversely relative to said vertical plane for cutting movement over said convolutions with a rolling action.

10. An apparatus for cutting a coil of metal strip into sheets comprising a platform, a vertical support at one side of said platform, a mandrel spaced vertically above said platform for supporting said coil in a horizontal position over said platform, said mandrel having a supporting connection at its inner end with said vertical support and projecting horizontally outwardly therefrom for supporting engagement with the innermost convolution of said coil, and coil cutting means comprising an endless conveyor mounted above said mandrel and having a lower run parallel to the axis of and spaced radially outwardly from said coil, said lower run lying in a vertical plane containing the said axis of said coil, a plurality of cutter elements mounted at spaced intervals along said endless conveyor, means for operating said conveyor continuously to move said cutter elements successively over said lower run, and means mounting said conveyor for vertical movement to an operative cutting position in which its said cutter elements during movement over said lower run have cutting engagement with the outermost convolution of said coil along an axial path in said vertical plane and above said mandrel, said conveyor mounting means comprising a parallelogram linkage comprising spaced upper and lower pivots on said vertical support defining a fixed link, a movable link parallel to said fixed link, upper and lower links having connections at one end respectively with said spaced pivots and pivotal connections at their other ends with opposite ends of said movable link, and a bracket support for said conveyor on said movable link rendering its movement in response to pivotal movement of said upper and lower links about said spaced upper and lower pivots effective to impart vertical movement to said conveyor.

References Cited by the Examiner

UNITED STATES PATENTS

| | | | |
|---|---|---|---|
| 424,425 | 3/90 | Macfarlane | 83—471 |
| 658,474 | 9/00 | Sparks | 83—326 |
| 894,617 | 7/08 | Fearon | 83—614 |
| 1,838,011 | 12/31 | St. Peter | 83—924 |
| 1,935,867 | 11/33 | Webster | 83—648 |
| 2,010,308 | 8/35 | Leonard | 83—614 |
| 2,627,825 | 2/53 | Stiles | 83—925 |
| 2,662,467 | 12/53 | Kaebnick et al. | 83—639 |
| 2,702,538 | 2/55 | Burkhardt | 143—32 |
| 2,759,501 | 8/56 | Kliever | 143—32 |
| 2,782,765 | 2/57 | Robinson | 83—639 |
| 2,822,045 | 2/58 | Moore | 83—639 |
| 2,880,636 | 4/59 | Freedman et al. | 83—924 |
| 2,947,065 | 8/60 | Moody et al. | 83—22 |

FOREIGN PATENTS

| | | |
|---|---|---|
| 216,830 | 8/58 | Australia. |
| 1,107,612 | 5/61 | Germany. |
| 153,717 | 11/20 | Great Britain. |
| 281,583 | 12/27 | Great Britain. |

ANDREW R. JUHASZ, *Primary Examiner.*

CARL W. TOMLIN, HUNTER C. BOURNE, Jr.,
*Examiners.*